Jan. 31, 1950 H. G. BLAKESLEE 2,495,688
COLLAR-HANDLE FOR LIQUID VESSELS
Filed Jan. 8, 1947
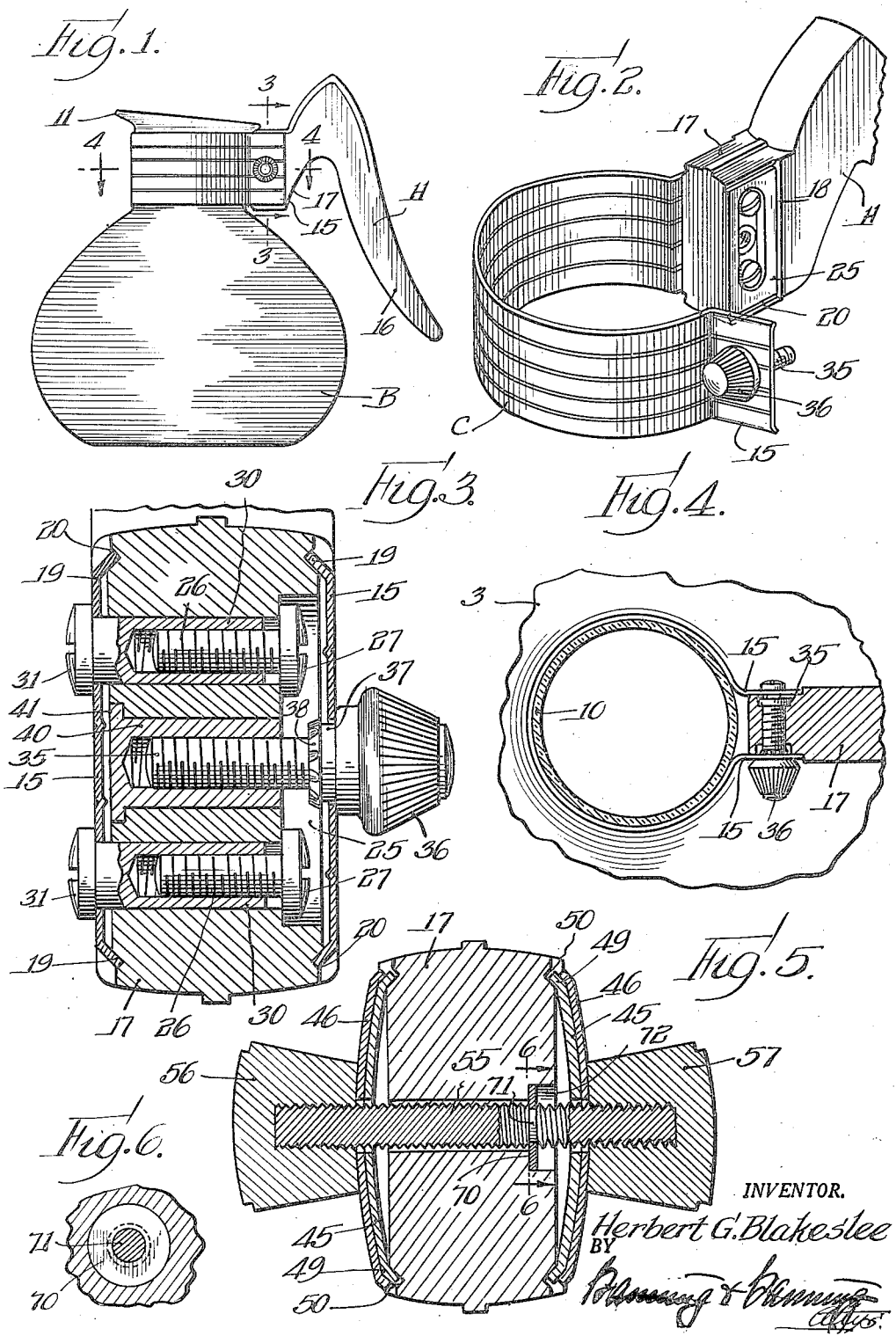
INVENTOR.
Herbert G. Blakeslee Patented Jan. 31, 1950

2,495,688

UNITED STATES PATENT OFFICE 2,495,688

COLLAR HANDLE FOR LIQUID VESSELS

Herbert G. Blakeslee, Evanston, Ill., assignor to Cory Corporation, Chicago, Ill., a corporation of Delaware Application January 8, 1947, Serial No. 720,730

8 Claims. (Cl. 294—27)

My invention relates to a collar-handle which is applicable to a vessel for containing liquids, usually in the general form of a decanter. Such a vessel which is commonly used as one component of a vacuum coffee brewer is often made of glass and so is fragile and liable to breakage. When breakage does occur, the collar-handle becomes useless unless it can be transferred to another like vessel for application thereto.

It is a primary object of my invention to provide for vessels of the kind noted a collar-handle which is attractive in appearance, sturdy in construction, and otherwise adapted to serve as a medium by which the vessel may be carried and handled in its various operations. A further important object is to provide in such a collar-handle means for securing its two ends around the neck of the vessel to which it is to be applied, the securing means to be operable quickly and simply to facilitate application or removal of the collar-handle to and from the vessel, as the case may be. In addition, the collar-handle embodies in its construction means whereby the connected parts are maintained in tight-fitting immovable relation, thereby obviating any looseness or free motion between the handle and the vessel. All these objects and purposes are accomplished by a construction which is simple, easy to produce and operate, and involving no separable parts which require assembly.

A collar-handle embodying the features of this invention is shown in the accompanying drawing in two suggestive forms, as follows:

Figure 1 is a view in side elevation of my improved collar-handle, shown as applied to a vessel of the decanter type;

Fig. 2 is a perspective view of the collar-handle per se;

Fig. 3 is a view in section, taken on line 3—3 of Fig. 1;

Fig. 4, which is a transverse section on line 4—4 of Fig. 1, shows a slight modification in the construction thereof;

Fig. 5, which is a view similar to Fig. 3, shows a modified connection between the collar and its associated handle; and Fig. 6 is a fragmentary detail in section, taken on line 6—6 of Fig. 5.

In Fig. 1 I have shown the lower bowl B of a coffee maker such as is commonly made of glass. The walls of the bowl converge near the top, then extend vertically upward at 10 to form an elongated neck which terminates in an open mouth having a pouring lip 11. The collar-handle of this invention is adapted to be fitted around such a neck to provide an ornamental band therefor and also a convenient means whereby the entire bowl may be handled.

Since a bowl of this character may be broken through carelessness in use, it is desirable that the collar-handle be susceptible of facile transference to a replacement bowl. In commercial establishments where the breakage rate is highest it is particularly important that the operation of removing the collar-handle from one bowl and of affixing it to another bowl be performed with a minimum of time and effort, and without resort to any tool or tools. The collar-handle now to be described embodies special features of improvement which adapt it to meet these particular requirements.

A relatively wide band is employed for the collar C. This is desirably of metal which is decorated, as with chromium. It is curved longitudinally through perhaps 300°, its two ends then being out-turned to provide ears 15. The handle H, made preferably from a composition material, is here shown as having a grip 16 extending outwardly and downwardly from a block 17 whose opposite sides are slightly inset to provide vertical shoulders 18. The marginal portions of the collar ears 15 are adapted to rest against the opposite sides of the block, the ends thereof abutting the shoulders 18 thereby to lie substantially flush with the outset side surfaces of the block. In addition, the upper and lower edges of the collar and ears may be angled inwardly at 19 for a snugger fit with a bowl neck and handle head, the latter being angularly grooved at 20 to receive the angled edges 19 interfittingly, as indicated clearly in Fig. 3.

Through the handle block I provide a plurality of transverse holes, one above the other, three being the number shown. One side of the block is recessed or countersunk at 25 adjacent the ends of these holes. In the top and bottom holes are threaded studs 26 whose slotted heads 27 lie within the recess 25 in spaced relation to the collar ear 15 which may remain permanently engaged with the proximate side of the handle block. Each stud is entered within a sleeve 30 which is interiorly threaded to coact therewith, and which is provided at its outer end with a slotted head 31 that rests against the outer face of the collar ear adjacent a hole therethrough which is provided for reception of the sleeve. It is manifest that when the studs are advanced rotatively within their associated sleeves, the engaged collar ear will be tightly and immovably secured to the handle block. The angled edges 19 may, if desired, be extended inwardly a sufficient distance to maintain the ears 15 spaced slightly from the proximate sides of the block for a purpose to be hereinafter noted.

The opposite ear 15 which is readily freed from the handle tends by resilient action of the collar to stand outwardly and away from the handle block (see Fig. 2), unless it be secured thereto by some such means as will now be described. For a simple, quickly manipulable fastening, I may employ a stud 35 which is entered through a somewhat larger opening in the collar ear; affixed to the outer end of this stud is an operating knob 36, desirably of ornamental character, having extended axially therefrom a neck 37 which surrounds the proximate end portion of the stud to pass through the ear opening which provides a bearing therefor; and slightly to the inside of the ear at the end of the neck is a plurality of indentations extending both inwardly and outwardly to frictionally engage the stud and also build up an irregular flange 38 which engages the inner face of the ear. By some such simple means as this I may lock the operating knob 36 non-rotatably to the stud 35 and, in cooperation with the knob, lock the stud against endwise movement in its mounting within the ear 15.

The stud 35 is threaded exteriorly to engage with the handle when the normally open collar is pressed inwardly to a closed position. The location of the stud is opposite the middle hole so that it will readily enter therein to engage therewith. Threads interiorly of this hole are provided for coaction with those on the stud. these threads being formed either in the handle block itself (see Fig. 4) or in a tubular bushing 40 whose head 41 is inset in the remote side of the block. When the stud is positioned opposite this threaded hole it will advance therein in response to turning of the knob, thereby tightening the engaged collar ear firmly in place against the proximate side of the handle block.

A modification of the construction just described is suggested in Fig. 5 where the two collar ears 45 are shown as bowed outwardly in a vertical plane so as to remain spaced from the handle block 17 except at their upper and lower edges which may be angled inwardly at 49 for tight interfitting within angle grooves 50 formed in the block. In this case I may employ supplementary bowed plates 46, disposed either to the inside or, as shown, to the outside of the ears 45, to enhance the spring action thereof. Through the handle block in this construction is a single transverse hole to accommodate a threaded stud 55 to whose projecting ends are affixed knobs 56 and 57, one bearing against each bowed plate 46. The knob 56 remains fixed on the stud, as by means of a tight threaded connection, and is subject to an endwise pull that is maintained by a locking washer 70 which is press-fitted on to the stud and within a circumferential groove 71 therein. This washer may rest within a countersunk recess 72 to bear against its bottom whose distance from the remote bowed plate 46 is such as to force a slight inward deflection thereof, thereby placing it under tension. The end thrust thus provided is relied upon to hold the stud 55 normally against turning while permitting the knob 57 to be freely applied to or removed from the stud end which is proximate to the opposite bowed plate 46. This construction permits a facile application of the collar-handle to the neck of a vessel in much the same way as already described in connection with Figs. 1–4.

By the construction described, in either of its forms, I provide means for quickly removing the collar-handle from a vessel neck, or for applying it thereto. The screw means employed for the purpose is readily manipulable without the aid of any tool, and all parts are carried operatively in place in permanently assembled relation. The only exposed parts may be so configured as to contribute to the ornamental appearance of the collar-handle—another feature of importance in a device of this character. When the collar-handle is secured fixedly in place, the screw means which is tightened for this purpose is maintained tensioned axially so as to provide a spring lock for resisting a reverse movement thereof. This tensioning may be augmented by the resiliency of the collar ear if deflected inwardly out of its normal plane. Any such deflection which may be so slight as not to be readily noticeable is made possible by providing for the purpose, behind each ear, a thin space into which the ear may recede at points remote from its flanged edges.

I claim:

1. For application to the cylindrical neck of a vessel, a collar-handle comprising a metallic band bent endwise through the major part of a circle and formed at its ends with out-turned ears adapted to be extended in substantial parallelism, a handle whereon is a block adapted for reception between the collar ears, flanges inturned from the edges of the ears adapted to engage grooves formed in opposite sides of the handle block to assure a predetermined spaced positioning of one with respect to the other, fastening means traversing one ear and engaged therewith and with the handle block to secure the one fixedly to the other, and other fastening means separate from and operable independently of the first mentioned fastening means and traversing the opposite ear and engaged inseparably therewith and separably with the handle block to secure the one releasably to the other without releasing said first mentioned fastening means.

2. For application to the cylindrical neck of a vessel, a collar-handle comprising a metallic band bent endwise through the major part of a circle and formed at its ends with out-turned ears adapted to be extended in substantial parallelism, a handle whereon is a block adapted for reception between the collar ears, flanges inturned from the edges of the ears adapted to engage opposite sides of the handle block to assure a predetermined spaced positioning of one with respect to the other, fastening means traversing one ear and engaged therewith and with the handle block to secure the one fixedly to the other, and other fastening means separate from and operable independently of the first mentioned fastening means and traversing the opposite ear and engaged inseparably therewith and separably with the handle block to secure the one releasably to the other without releasing said first mentioned fastening means.

3. For application to the cylindrical neck of a vessel, a collar-handle comprising a metallic band bent endwise through the major part of a circle and formed at its ends with a pair of out-turned ears adapted to be extended in substantial parallelism, a handle whereon is a block adapted for reception between the collar ears, there being formed transversely through the block a hole countersunk at one end, coacting screw means, with heads at opposite ends, extended through the hole and through one collar ear with one of the heads engaging the ear and the other the remote side of the handle block within the countersunk area thereof, a screw device entered through the opposite collar ear and provided with securing means for preventing movement axially thereof while permitting rotation relative thereto, operating means for the screw device disposed exteriorly of the associated collar ear, and screw means disposed within the handle block opposite the screw device for coaction therewith adapted in response to rotation thereof to draw the screw device axially into the handle block to thereby lock the associated collar ear thereto and provide a closure over the head of the screw means disposed within the countersunk area of the handle block.

4. For application to the cylindrical neck of a vessel, a collar-handle comprising a metallic band bent endwise through the major part of a circle and formed at its ends with out-turned ears adapted to be extended in substantial parallelism, a handle whereon is a block adapted for reception between the collar ears, screw means separable from the block and one collar ear for securing the one fixedly to the other, and a screw device separate from and operable independently of said screw means inseparable from the other collar ear and engageable within the block for releasably securing one to the other, the block faces being formed with depressed areas opposite the points of its attachment to the collar ears whereby the latter may be deflected thereinto to maintain a tension axially of the screw means and screw device to enhance the frictional resistance thereof to rotation.

5. For application to the cylindrical neck of a vessel, a collar-handle comprising a metallic band bent endwise through the major part of a circle and formed at its ends with out-turned ears adapted to be extended in substantial parallelism, a handle whereon is a block adapted for reception between the collar ears, screw means separable from the block and one collar ear for securing the one fixedly to the other, and a screw device separate from and operable independently of said screw means inseparable from the other collar ear and engageable with the block for releasably securing one to the other, one of the block faces being formed with a depressed area opposite its point of attachment to the proximate collar ear whereby the latter may flex inwardly thereinto to maintain a tension axially of the screw device to enhance the frictional resistance thereof to rotation.

6. For application to the cylindrical neck of a vessel, a collar-handle comprising a metallic band bent endwise through the major part of a circle and formed at its ends with out-turned ears adapted to be extended in substantial parallelism, a handle whereon is a block adapted for reception between the collar ears, one block face being formed with an extended countersunk area wholly within the confines of the proximate ear so as to be covered thereby, three aligned openings extended transversely through the block and, oppositely of the end openings, two openings in one ear and, oppositely of the middle opening, one opening in the other ear, an interiorly threaded sleeve entered through each end opening with its head engaged with the exterior face of the one ear, threaded studs coacting with the sleeves entered from opposite ends of the same openings with their heads engaged with the bottom of the countersunk area, a stud entered through the other ear and locked thereto against axial movement thereof and adapted for entry into the middle opening within the block for screw threaded engagement therewith whereby to tightly but releasably secure the associated ear to the block and, under sufficient pressure, to deflect the ear into the countersunk area for subjecting the stud to a resilient tension axially thereof.

7. For application to the neck of a vessel, a collar-handle comprising a metallic band bent endwise through the major part of a circle and formed at its ends with out-turned ears adapted to be extended in substantial parallelism, a handle whereon is a block adapted for reception between the collar ears, fastening means for securing one ear fixedly to the block upon one side thereof, and means separate from and operable independently of said fastening means for securing the other ear releasably to the block upon its opposite side wherein is a transverse opening, said latter means including a threaded stud adapted to enter the transverse opening of the block for locking engagement therewith, a knob from which is axially extended a neck in surrounding engagement with one end of the stud, there being a hole through the ear wherein the neck may be journaled for rotation, and means struck outwardly and inwardly from the inner end of the neck to frictionally lock with the stud and to project alongside the inner face of the ear to provide the knob upon its opposite face a dual means for preventing axial movement of the stud relative to the ear.

8. For application to the neck of a vessel, a collar-handle comprising a metallic band bent endwise through the major part of a circle and formed at its ends with out-turned ears adapted to be extended in substantial parallelism, a handle whereon is a block adapted for reception between the collar ears, fastening means for securing one ear fixedly to the block upon one side thereof, cooperating means on the block for centering the ears in a predetermined position relative thereto, means extended inwardly from the edges of the ears into engagement with the block adapted to maintain the ears in spaced relation thereto, and screw means separate from and operable independently of said fastening means and traversing the adjacent ear and block and providing therebetween a separable connection adapted also to deflect the adjacent ear inwardly to place the screw means under resilient tension axially thereof.

HERBERT G. BLAKESLEE.

REFERENCES CITED

The following references are of record in the file of this patent:

UNITED STATES PATENTS

| Number | Name | Date |
|---|---|---|
| 2,275,876 | Werfel | Mar. 10, 1942 |
| 2,307,145 | Mattoon | Jan. 5, 1943 |
| 2,378,867 | Reichart | June 19, 1945 |
| 2,395,140 | Peterson | Feb. 19, 1946 |